May 29, 1962 W. R. NOVAK Re. 25,176

FACE GUARD FOR FOOTBALL PLAYERS

Original Filed Sept. 9, 1957

William R. Novak

INVENTOR.

BY Thomas A. O'Brien and Harvey B. Jacobson Attorneys

United States Patent Office

Re. 25,176
Reissued May 29, 1962

25,176

FACE GUARD FOR FOOTBALL PLAYERS

William R. Novak, Utica, Ill., assignor to Protexall Face Mask Company, Ottawa, Ill., a corporation of Illinois Original No. 2,929,070, dated Mar. 22, 1960, Ser. No. 682,871, Sept. 9, 1957. Application for reissue May 9, 1961, Ser. No. 121,798
4 Claims. (Cl. 2—9)

Matter enclosed in heavy brackets [ ] appears in the original patent but forms no part of this reissue specification; matter printed in italics indicates the additions made by reissue.

The present invention relates to an improved face guard for a football player and has to do, more particularly stated, with an open-type mask-like guard which is applicable to and carried by a conventional-type helmet.

Persons conversant with the state of the art to which the present invention relates are well aware that many and varied styles and forms of face guards have been evolved and offered with a view toward affording reliable protection to the user thereof. On the basis of trial and error experiment certain prior art face guards have been adopted and are meeting with widespread usage. Others which have, apparently, failed to measure up to expectations and needs appear to have been discarded. With a view toward advancing the art, the instant concept ties in with a desire to promote progress in this line of endeavor and, in so doing, to provide a specially constructed adaptation which complies with practical manufacturing requirements and economies and, what is most important, is calculated to afford the wearer maximum protection.

In carrying out the ideas and intentions under advisement, the present invention features a construction wherein a novel structural unit or entity embodies novelly located components which are well braced and stabilized by reason of the fact that the complete unit has four-point connection with the left and right cheek portions of a conventional helmet, making the guard a substantially firm and permanently attached part of the helmet.

By appropriating and using four widely separated and properly distributed suspension points and spacing the components from the wearer's facial features the combination helmet and guard becomes an over-all safe and reliable protector for the wearer.

Briefly, the invention and the combination evaluation is characterized by a conventional-type helmet having cheek portions at its respective vertical sides, and a chin-strap having end portions fastened to said cheek portions; and a complemental mask-like face guard of openwork form embodying left and right upper jaw guard members, left and right lower jaw guard members, a nose guard, a chin guard, and a mouth guard, said guard as an entity being fabricated into a substantial unit and having four-point connection with spaced cooperating areas of said cheek portions.

Considered as an attachment to and for use in conjunction with a football helmet and somewhat more specifically construed the invention comprises an entity which may be interpreted as comprising an upper rubber covered bow having a median bend formed into an inverted U-shaped portion constituting an upstanding nose guard, a companion lower bow having a similar median bend providing a second U-shaped portion and constituting a chin guard, portions of said bows to the left and right, respectively, of the U-shaped portions being welded together, said U-shaped portions being disposed in a plane generally common to each other, the terminal ends of said bows being formed with attaching eyes, and a short bow centrally bridging the space between said U-shaped portions and serving as a mouth guard, the limb portions of said upper and lower bows providing upper and lower jaw guards.

Other objects, features and advantages will become more readily apparent from the following description and the accompanying drawing.

In the drawing, wherein like numerals are employed to designate like parts throughout the views.

Figure 1:
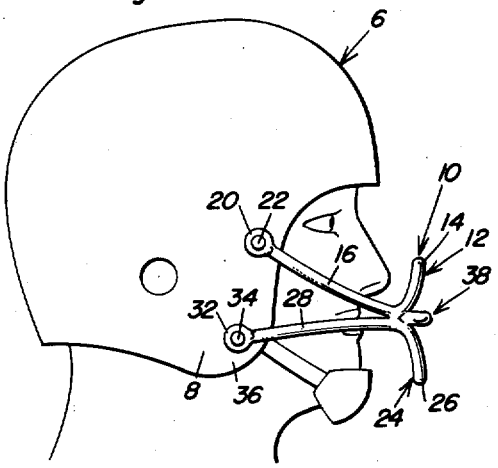
FIG. 1 is a side elevation of the improved face guard and the helmet to which it is attached, showing the mode of construction and use of the same.
Figure 2:
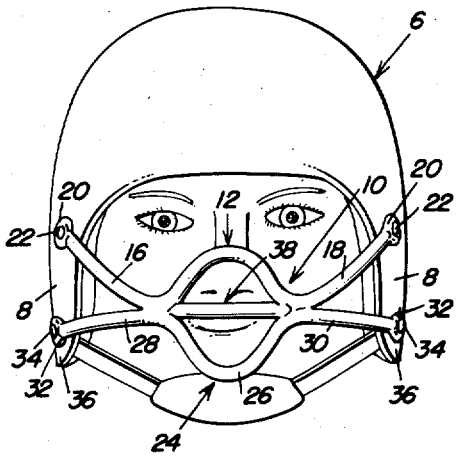
FIG. 2 is a front elevation of the same, that is a view observing FIG. 1 in a direction from right to left.

Referring now to the drawings and to FIGS. 1 and 2, the conventional helmet is denoted by the numeral 6, the aforementioned vertical side or cheek portions being denoted at 8.

The guard is fashioned into a structural entity or unit wherein all of the components are joined together in predetermined relationship. As a unit the guard is denoted by the numeral 10. The aforementioned upper bow is of suitable longitudinally curvate or arcuate form and the median portion 12 thereof is bent into inverted generally U-shaped form. The bight portion 14 thereof is of such curvature that when it is located it provides a highly efficient nose guard. The end portions of the nose guard terminate in the approximate plane illustrated in the drawings and the rearwardly and upwardly curving limb portions 16 and 18 designate upper jaw guards or members. These members terminate in suitable eyes 20 which are superimposed upon the upper cheek portion and are riveted or otherwise securely fastened thereto as at 22 in FIGS. 1 and 2.

The complemental lower bow likewise has a substantially U-shaped bend or portion 24 and the bight portion 26 is such that a highly satisfactory chin guard is provided. In connection with this bow the limbs or arms 28 and 30 are properly curved and placed to provide lower jaw guard members. Here again, terminal eyes 32 are superimposed upon and securedly riveted or fastened at 34 to the lobe 36 of the cheek portion 8. The respective end portions of the U-shaped bends or guards 12 and 24 merge together and are welded securely and in so doing diametrically opposite crotches are provided to accommodate the end portions of the smaller or third bow 38 which is centralized between the guards 24 and provides a guard for the wearer's teeth and mouth, referred to broadly as a mouth guard.

Figure 3:
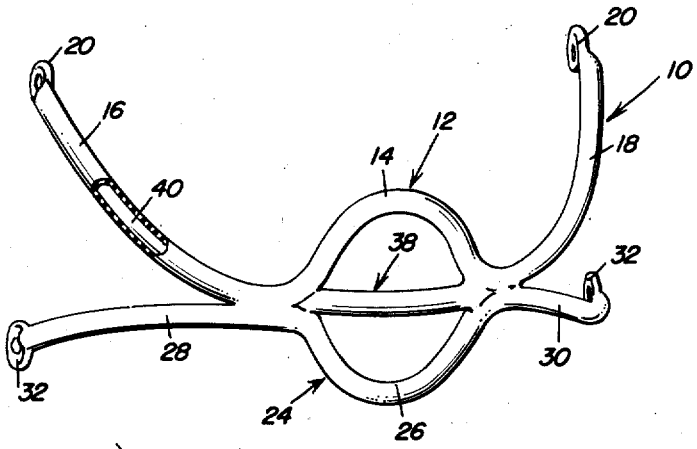
FIG. 3 is a perspective view of the face guard by itself.
Figure 4:
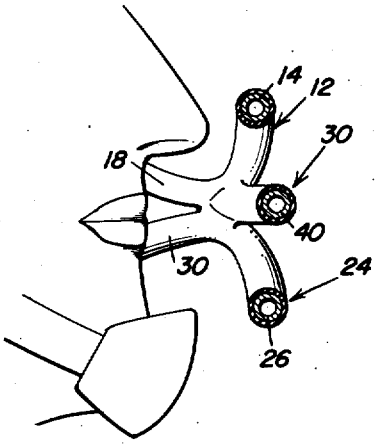
FIG. 4 is an enlarged fragmentary sectional view taken vertically through the central portion of the guard.

In actual practice the bows are formed from segmental or equivalent rods, one of which is denoted at 40 in FIG. 3 and all of the rods are covered or coated with a suitable plastic or rubber.

It is within the purview of the invention to mold the entire unit from appropriate commercial plastics or nylon [or] *of* requisite rigidity.

The design of the over-all construction is such that the guard offers maximum protection, greatest stability and rigidity, and a minimum of impairment of vision compared to any guard now on the market.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

The invention is hereby claimed as follows:

1. A face guard for rigid attachment to a conventional-type football helmet comprising an upper rod longitulinally formed into a bow and having [a] *an upstanding* :entralized median U-shaped bend constituting an up-:tanding nose guard, a lower rod formed into a bow *of :imilar curvature to said bow in said upper rod* having a :imilar *downwardly extending* median U-shaped bend pro-/iding a chin guard, portions of said bows to the left and :ight, respectively, of the U-shaped bends *and immedi-ıtely adjacent thereto* being *united,* [welded together, said J-shaped bends being disposed and cooperating in a plane ;enerally common to each other,] the terminal ends of ;aid bows being formed with attaching eyes, and a third ıut relatively short bow centrally bridging the space be-ween said U-shaped bends and serving as a mouth guard, he limb portions of said upper and lower bows providing ıpper and lower jaw guards, and the latter being disposed n rearwardly [convergent] *divergent* relationship *in a V-shape from the points of their union on the left and ight, respectively, of said* U-*shaped bends.*

2. A face guard expressly constructed and designed to ›e rigidly mounted on the usual cheek portions embodied n the vertical sides of a football helmet comprising an ıpper longitudinally bowed rod, the median portion of aid rod being of inverted U-shape form and defining a ıose guard, the portions to the left and right of said nose ;uard defining and providing jaw protecting members ınd terminating at their respective outer ends in attach-ng and retaining eyes, a second rod a companion to said irst named rod and constituting a lower rod and being ongitudinally bowed *in similar curvature to the bow in aid upper rod* and having a median U-shaped bend simi-ar to the first named bend and having its open side regis-ering with the open side of the first named U-shaped ›end and the two bends together providing an impact re-eiving member, *portions of said bowed rods to the left ınd right, respectively, of* said U-bends *and immediately djacent thereto* being *united,* [welded together and being ;isposed generally in a plane which is common to each ›ther,] the lower U-shaped bend constituting a chin guard nd the portions of the rod between the ends thereof being ormed into jaw protecting members and terminating in ttaching and retaining eyes, the jaw protecting members ɔ the left of the center being disposed in rearwardly ;convergent] *divergent* relationship and the correspond-ıg members to the right being likewise disposed in rear-/ardly divergent relationship so that when the respective yes are attached to predetermined portions of the sup-orting helmet a four-point suspension for the over-all uard is had, the respective connected [end] portions of *aid bows to the left and right, respectively, of* the U-haped bends defining diametrically opposite crotch-like eats, and a third relatively short rod bridging the space ıidway between the bight portions of the nose guard and hin guard, respectively, and having its ends affixed to aid guards in line with the crotch-like seats.

3. A face guard expressly constructed and designed to e rigidly mounted on the usual cheek portions embodied ı the vertical sides of a football helmet comprising an pper longitudinally bowed rod, the median portion of aid rod being of inverted U-shape form and defining a ıose guard, the portions to the left and right of said nose uard defining and providing jaw protecting members nd terminating at their respective outer ends in attaching and retaining eyes, a second rod a companion to said first named rod and constituting a lower rod and being longitudinally bowed and having a median U-shaped bend similar to the first named bend and having its open side registering with the open side of the first named U-shaped bend and the two bends together providing an impact receiving member, *portions of said bowed rods to the left and right, respectively, of* said U-bends being *united,* [welded together and being disposed generally in a plane which is common to each other,] the lower U-shaped bend constituting a chin guard and the portions of the rod between the ends thereof being formed into jaw protecting members and terminating in attaching and retaining eyes, the jaw protecting members to the left of the center being disposed *in a* V *shape from the point of their union on the left of said* U-*shaped bends* in rearwardly [convergent] *divergent* relationship and the corresponding members to the right being likewise disposed *in a* V *shape from the point of their union on the right of said* U-*shaped bends* in rearwardly divergent relationship so that when the respective eyes are attached to predetermined portions of the supporting helmet a four-point suspension for the over-all guard is had [, the respective connected end portions of the U-shaped bends defining diametrically opposite crotch-like seats].

*4. A face guard expressly adapted to be used on a conventional-type football helmet comprising a nose to chin protecting frontal portion wherein the upper portion of said frontal portion is an upwardly arched rod adapted to be disposed in front of the nose, and the lower portion of the frontal portion is a downwardly arched rod adapted to be disposed ahead of the chin of the wearer of a football helmet when said face guard is mounted on said helmet, a first pair of upper and lower rods rigidly joined at an apex to each other and also at said apex to one side of said frontal portion, said first pair of rods diverging rearwardly and outwardly in a* V-*shape from said one side of said frontal portion, a second pair of upper and lower rods rigidly connected at an apex to each other and also rigidly connected at said apex to the other side of said frontal portion in a position substantially horizontally opposite said first pair of rods, said second pair of rods similarly diverging rearwardly and outwardly in a* V-*shape from said other side of said frontal portion, and each of said upper and lower rods in said first and second pairs having attaching means at the ends thereof, by use of which means said ends of each pair can be rigidly attached to a side portion of a football helmet at spaced points on each side portion to provide a rigid, four-point attachment thereto.*

References Cited in the file of this patent or the original patent

UNITED STATES PATENTS

| | | |
|---|---|---|
| 379,655 | O'Sullivan | Mar. 20, 1888 |
| 2,105,607 | McMillan | Jan. 18, 1938 |
| 2,351,752 | Fay | June 20, 1944 |
| 2,785,405 | Snyder | Mar. 19, 1957 |
| 2,790,175 | Sowle | Apr. 30, 1957 |
| 2,881,442 | Sowle | Apr. 14, 1959 |